DETECTION AND RANGING SYSTEM USING ELECTRO-OPTICAL MEANS

Filed Aug. 14, 1967 2 Sheets-Sheet 1

INVENTORS
BURTON A. BABB
STEPHEN J. ERST
BY WENDELL A. COOK
ATTORNEY

INVENTORS
BURTON A. BABB
STEPHEN J. ERST
BY WENDELL A. COOK
Menotti J. Lombardi
ATTORNEY

United States Patent Office 3,552,854
Patented Jan. 5, 1971

3,552,854

DETECTION AND RANGING SYSTEM USING ELECTRO-OPTICAL MEANS

Burton A. Babb, Stephen J. Erst, and Wendell A. Cook, Fort Wayne, Ind., assignors to International Telephone and Telegraph Corporation, Nutley, N.J., a corporation of Maryland

Filed Aug. 14, 1967, Ser. No. 660,403
Int. Cl. G01c *3/09*
U.S. Cl. 356—4 8 Claims

ABSTRACT OF THE DISCLOSURE

A passive electro-optical means of extracting range information from a scanned video signal. The technique combines the optical principle of depth of field with knowledge of the spectral (frequency) content of scanned video information.

BACKGROUND OF THE INVENTION

This invention relates generally to a detecting and ranging system using a focus-spectrum technique, and more particularly, to a passive electro-optical means of extracting range information from a scanned video signal, combining the optical principle of depth of field with the knowledge of the frequency content of the scanned video information.

The application of passive electro-optical techniques to solve the problems of fuzing systems, collision avoidance systems, intruder detection systems, obstacle avoidance devices for the blind, character recognition systems, distance determination systems for use in hazardous or inaccessible environments, and altimeters, are areas which have generally been neglected. Passive electro-optical techniques are, however, capable of superior performance in these areas.

Improvements are anticipated in such areas as reliable detection at longer ranges, generation of useful response at higher closing velocities, expanded area coverage by means of multiple lens systems and of fiber optics, increased system sensitivity through use of improved sensors and auxiliary illumination sources, use of integrated servo system to generate an analog range function, development of a simplified portable unit, and improvements in the use of infrared techniques.

SUMMARY OF THE INVENTION

It is therefore an object of the invention to provide a detection and ranging system using focus-spectrum analysis.

A further object of this invention is to uniquely combine the optical principle of depth of field with the spectral (frequency) content of scanned video information.

According to the broader aspects of the invention, relating to the basic concept of depth of field, use of a lens system of suitably large aperture and long focal length produces a relatively narrow depth of field, particularly at short object distances. Blurriness caused by circle of confusion effects limits the high frequency content of a scanned video signal for images formed outside the zone of focus. By employing frequency comparison techniques, it is then possible to detect objects at a range determined by the focal zone.

A feature of this invention is that it is particularly applicable to establish the existence of an object at some fixed distance along a visual line-of-sight.

BRIEF DESCRIPTION OF THE DRAWINGS

The invention will now be explained with reference to FIGS. 1–4 of the accompanying drawings, in which:

FIG. 4 is a typical system block diagram.

DESCRIPTION OF PREFERRED EMBODIMENT

Figure 1:
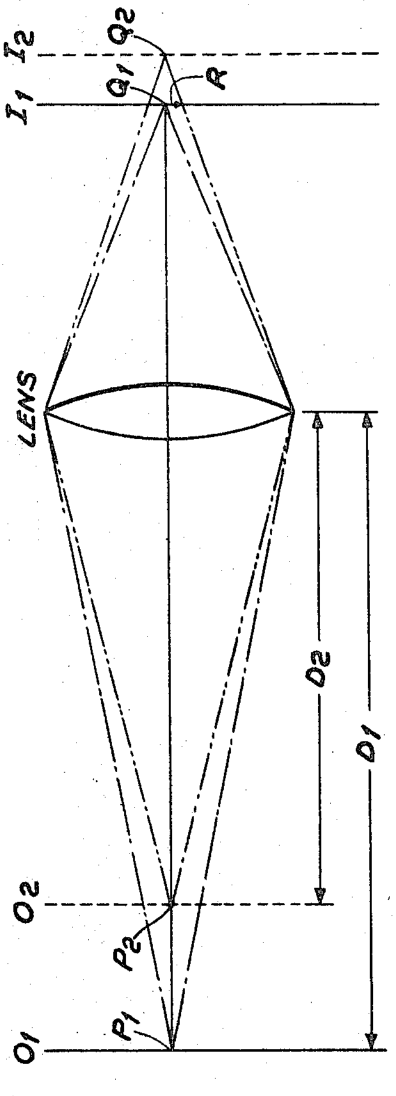
FIG. 1 shows the basic depth of field concept.

The basic concept of depth of field is diagrammed in FIG. 1. When an object is located at position $O_1$, a distance $D_1$ from the lens, point $P_1$ of the object is exactly in focus at point $Q_1$ of image plane $I_1$. If the object is now moved to a new position $O_2$ at a distance $D_2$ from the lens, the same point, now at point $P_2$, is exactly in focus at $Q_2$ on a new image plane $I_2$. Viewing the original image plane $I_1$, point $P_2$ will appear as a circle of confusion of radius R. Quantitatively, using formula hereinafter developed, for a lens of 6 inches focal length and 4 inches aperture, an object initially focussed at a distance of 100 feet and moved to a distance of 10 feet, the resultant circle of confusion projected on the original image plane $I_1$ is approximately 0.18 inch.

Depth of field is primarily dependent on the aperture and focal length of the lens, and on the lens to object distance. A lens system having a relatively large aperture and long focal length exhibits a correspondingly narrow depth of field, particularly at short object distances. This is a phenomena well known in both photography and TV work. The effect can easily be seen in a typical close-up photo or television presentation. A figure in the foreground is sharply defined, while objects in the background are somewhat blurry and indistinct. This blurriness results from circle of confusion effects, as indicated in FIG. 1.

In TV-type representations of an image, each horizontal scan line is effectively divided into a number of image elements, primarily determined by the sweep time and the maximum video frequency. In commercial TV the usable portion of each scan line is about 53.3 $\mu$sec., and the maximum video frequency is approximately 4.0 mHz. Assuming the two elements per cycle indicated by information theory, this yields $$2\times 4\times 10^6\times 53.3\times 10^{-6}=426$$

picture elements per scan line. This is the maximum theoretical number of discernible contrast changes that can be transmitted per line, and hence represents the maximum theoretical resolution capability. It should, of course, be noted that the resolution capability of the image sensor and of the lens system are also directly involved. Since these capabilities are normally masked by the limited information transmitted by a standard TV system, their effects have not been mentioned in this illustrative discussion.

In the video signal generated for any particular scan line, the maximum 4.0 mHz. frequency may not be present, however. High video frequencies are normally generated only when there are regions of rapid contrast change in the scene being televised. Such changes usually are caused by a sharp edge or boundary of some sort, viewed under suitable lighting conditions. Typical examples would be the edge of a building, bricks in a wall, or the boundary of a highlighted foreground figure viewed against a dark background.

The relative amount of high frequency content developed in any particular scan line depends upon the number of rapid contrast changes encountered in that line of the scene. A brick wall thus yields more such changes than a flat painted wall.

The amplitude of the high frequency content depends upon the degree of contrast change. A rapid black-to-white change produces a large amplitude signal change; a rapid change from a given grey-level to the next discernible grey-level can also produce a high frequency component, but at a considerably lower amplitude.

The basic premise of the focus-spectrum technique is that the amount of high frequency video output obtained from an object viewed out-of-focus is less than that obtained from the same object viewed in focus.

Figure 2:
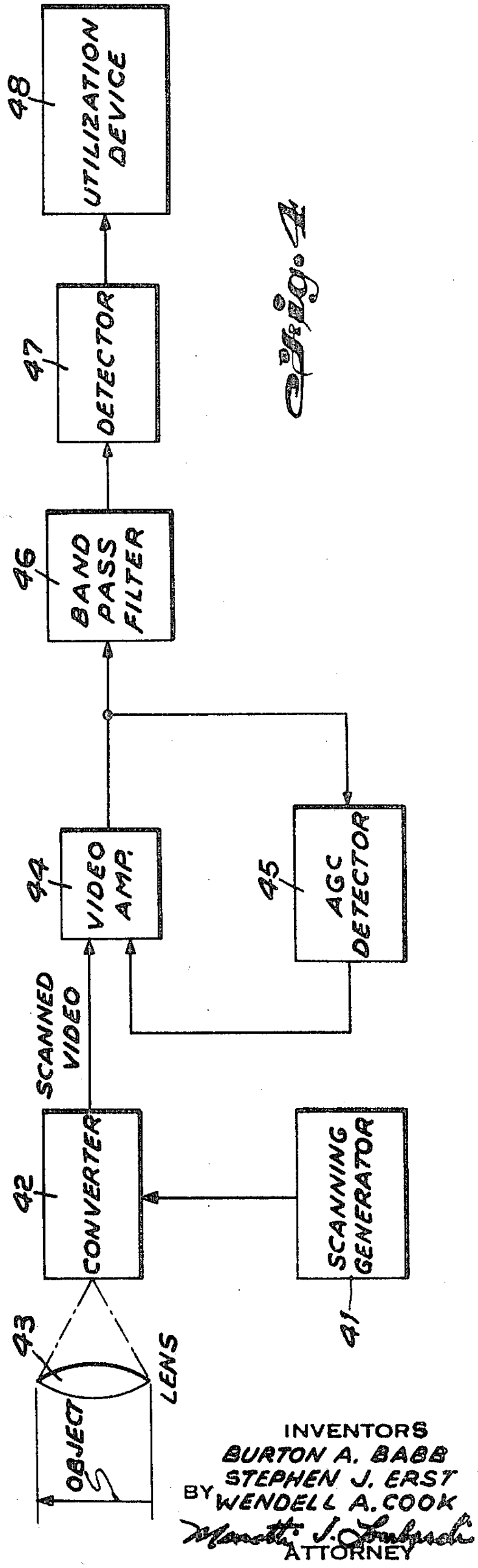
FIG. 2 is a theoretical representation of the highest frequency content.
Figure 2:
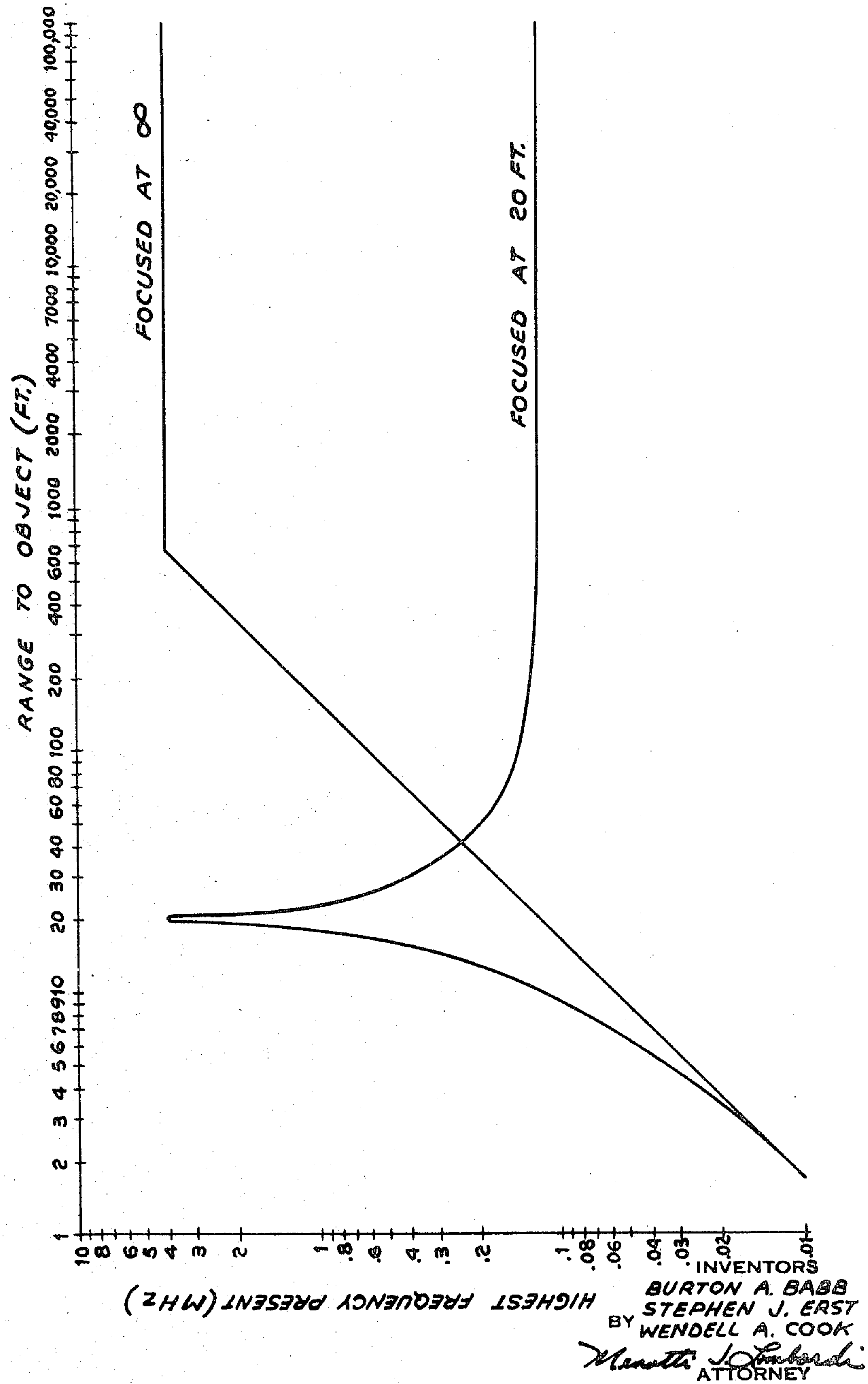

FIG. 2 gives a theoretical indication of the limits which may be imposed on frequency content. In deriving these curves, it has been assumed that the smallest picture element which can be resolved is that determined by the radius of the circle of confusion in the image viewplane which results from a point located at the object distance.

$$R=\frac{Af}{2P}$$

where

A=diameter of aperture
$f$=focal length
P=lens to object distance

For a system focused at some lens to object distance $P_1$, the radius of the circle of confusion for a point on an object at distance $P_2$ is given by $$R=\frac{A}{2Q_2}|Q_2-Q_1|$$

where $$Q_1=\frac{fP_1}{P_1-f}=\text{distance from lens to image of } P_1$$

$$Q_2=\frac{fP_2}{P_2-f}=\text{distance from lens of image to } P_2$$

Figure 3:
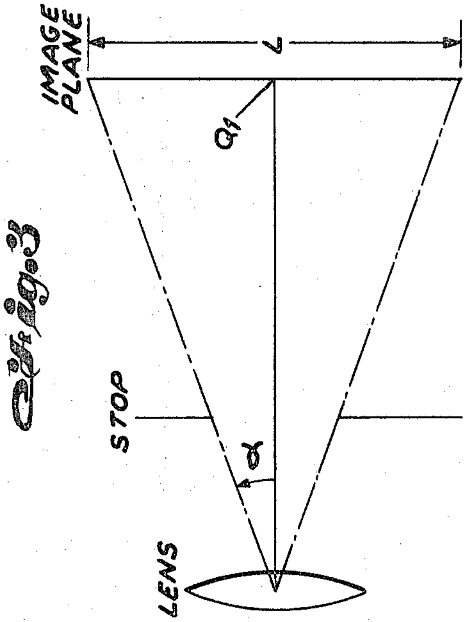
FIG. 3 illustrates image size versus viewing angle.

Referring to FIG. 3, the number of elements, N, per scan line can then be determined from the relationship $$N=L/R$$

where $L=2Q_1 \tan\alpha$
$\alpha=\frac{1}{2}$ viewing angle

The value of the maximum frequency contained in the video signal is then determined from $$F_{max}=\frac{N}{2s}\leq 4.0 \text{ mHz for commercial TV}$$

where $s$=usable scan time$\cong$53.3 $\mu$sec. for commercial TV

For the standard commercial TV frequencies assumed, $F_{max}$=4.0 mHz. for $N\geq 426$, and is given by the above equation for $N\leq 426$. The highest frequency which can theoretically be present for an object at the distances indicated is depicted in FIG. 2 for the assumed conditions of standard commercial TV frequencies, and a lens system having a 6 in. focal length, 4 in. aperture, and 6 degree viewing angle.

Under actual conditions, the results obtained are expected to depart somewhat from the theoretical. If the object has no sharp boundaries, the highest frequencies indicated will not be generated in the usable scan line. No real camera, lens system, or image-to-signal converter can be expected to perform as perfecly as indicated. Also, in an actual system high frequency components are generated by the various synchronizing and blanking pulses; any usable system will probably have a revised synchronization scheme or employ frequency or time discrimination techniques to circumvent these effects. Still, it should be possible to build a system based on the principles herein described, which will, for almost any optically discernible object, yield a response of the general type indicated.

FIG. 4 presents a system block diagram. A scanning generator 41 causes the converter 42 to transform the optical image formed by lens 43 into a scanned video output signal. Depending upon the particular application, the converter might be a moderate sensitivity vidicon or other fairly simple TV camera tube, a more sensitive tube, such as an image orthicon, or some type of solid-state conversion device. The video signal provided by the converter 42 is amplified in video amplifier 44 and applied to an AGC detector 45 and a band-pass filter 46. The AGC detector 45 provides a portion of the rectified signal as feedback to the video amplifier 44, which causes the average output signal level to be maintained constant over a relatively large range of illumination levels. The bandpass filter 46 selects part of the high frequency portion of the video signal, which is rectified by the object detector 47. This information is applied to a utilization device 48; this device may include a logic network for processing the information and control circuits which in response to the output of the logic networks causes the information to be utilized.

This technique is expected to find use primarily in those applications for which it is desired to determine a fixed range to the nearest object, along some visual line-of-sight. Even when small interference particles are in focus, the frequency information obtained from these should be low compared with that received from an in-focus object. The system would of course be frequency immune and illumination variations are handled simply as a level change, by means of automatic gain control or some form of controlled saturation.

In summary, the focus-spectrum technique is a combination of two basic principles. It appears particularly applicable to establish the existence of an object at some fixed distance along a visual line-of-sight. A system with these basic characteristics could, for example, be applied to collision prevention requirements and intruder detection problems.

While we have described above the principles of our invention in connection with specific apparatus, it is to be clearly understood that this description is made only by way of example and not as a limitation to the scope of our invention as set forth in the objects thereof and in the accompanying claims.

We claim:

1. An object detection and ranging system comprising:
an optic means having a lens for forming an optical image of an object at an image plane, the image being sharply defined when the object is in focus and being blurry due to a circle of confusion effect when out of focus;
a converter positioned in said image plane to convert said optical image into a video signal;
a scanning generator connected to said converter to transform said optical image into a scanned video signal, said signal having a high content of high frequencies from the sharply focused image and having a low content of the high frequencies from the image out of focus;
a band pass filter for passing the high frequency portion of the video signal;
a detector to detect the high frequency portion of said signal; and
utilization means for determining the distance between the optic means and the object from the detected high frequency content.

2. A system according to claim 1, further comprising:
an amplifier interposed between said converter and said band pass filter for amplifying the scanned video signal; and
an AGC detector for providing a portion of the amplified video signal as feedback to said video amplifier so that average output signal level is maintained over a relatively large range of illumination levels.

3. A system according to claim 1 wherein said converter is a vidicon tube, an image orthicon tube, or a solid-state conversion device.

4. A system according to claim 1 wherein said converter is responsive to radiated infrared energy to produce said scanned video signal.

5. A detection and ranging system comprising:

a lens focusing an object at an image plane for a predetermined lens-to-object distance;

a converter positioned in said image plane to convert an optical image into a video signal;

a scanning generator to transform said optical image into a scanned video signal, said signal having a high content of high frequencies from the sharply focused image and having a low content of high frequencies from the image out of focus;

a video amplifier for amplifying the video signal from said converter;

a band pass filter for passing the high frequency portion of the amplified video signal;

a detector for detecting the presence of the high frequency portion of the video signal; and means utilizing the output of said detector to determine the sharpness of focus of said image and the distance between the object and lens.

6. A system according to claim 5 wherein the amplified video signal is further applied to an AGC detector which provides a rectified portion of said signal as feedback to said video amplifier, such that average output signal level is maintained constant over a relatively large range of illumination levels.

7. A system according to claim 6 wherein said converter is a vidicon tube, an image orthicon tube, or a solid-state conversion device.

8. A system according to claim 5 wherein said converter is responsive to radiated infrared energy rather than from reflected light energy.

References Cited

UNITED STATES PATENTS

| | | | |
|---|---|---|---|
| 3,147,335 | 9/1964 | Guerth | 356—4 |
| 3,199,400 | 8/1965 | Zabinski | 356—4 |

RODNEY D. BENNETT, Jr., Primary Examiner

J. G. BAXTER, Assistant Examiner